(12) United States Patent
Hornhofer

(10) Patent No.: US 7,011,206 B2
(45) Date of Patent: Mar. 14, 2006

(54) VERTICAL CONVEYOR IN THE FORM OF A C-SHAPED CIRCULATING CONVEYOR FOR VERTICAL CONVEYANCE OF UNIT LOAD ITEMS

(75) Inventor: Franz Hornhofer, Veitsch (AT)

(73) Assignee: Knapp Logistik Automation GmbH, Hart bei Graz (AT)

( * ) Notice: Subject to any disclaimer, the term of this patent is extended or adjusted under 35 U.S.C. 154(b) by 0 days.

(21) Appl. No.: 10/474,869

(22) PCT Filed: Apr. 1, 2002

(86) PCT No.: PCT/EP02/03599

§ 371 (c)(1),
(2), (4) Date: Mar. 9, 2004

(87) PCT Pub. No.: WO02/081342

PCT Pub. Date: Oct. 17, 2002

(65) Prior Publication Data

US 2004/0144624 A1    Jul. 29, 2004

(30) Foreign Application Priority Data

Apr. 9, 2001    (DE) .................................. 101 17 665

(51) Int. Cl.
*B65G 17/16*    (2006.01)

(52) U.S. Cl. ..................................... 198/793; 198/797
(58) Field of Classification Search ................ 198/793, 198/794, 797, 799
See application file for complete search history.

(56) References Cited

U.S. PATENT DOCUMENTS

| | | | | |
|---|---|---|---|---|
| 3,024,891 A | * | 3/1962 | Sawrie | 198/799 |
| 3,268,061 A | * | 8/1966 | De Good et al. | 198/799 |
| 3,756,378 A | * | 9/1973 | Kuehl et al. | 198/799 |
| 4,627,530 A | * | 12/1986 | Franke | 198/799 |
| 4,739,876 A | * | 4/1988 | Ammeraal | 198/799 |
| 5,263,574 A | * | 11/1993 | Hix | 198/799 |

FOREIGN PATENT DOCUMENTS

| | | |
|---|---|---|
| DE | 465 746 | 9/1928 |
| DE | 1 238 843 | 4/1967 |
| EP | 0 396 925 | 11/1990 |
| FR | 2 123 099 | 9/1972 |
| GB | 1 446 859 | 8/1976 |

* cited by examiner

Primary Examiner—James R. Bidwell
(74) Attorney, Agent, or Firm—McGlew and Tuttle, P.C.

(57) ABSTRACT

A vertical conveyor in the form of a said C-shaped fixed tray conveyor (1) for the vertical conveying of individual products from and to a lower level (3) to or from a upper level (2) on essentially horizontal, vertically movable spaced carrying platforms (6).

18 Claims, 8 Drawing Sheets

Fig_5

VERTICAL CONVEYOR IN THE FORM OF A C-SHAPED CIRCULATING CONVEYOR FOR VERTICAL CONVEYANCE OF UNIT LOAD ITEMS

FIELD OF THE INVENTION

The present invention pertains to a vertical conveyor in the form of a C-shaped fixed tray conveyor for vertically conveying individual products from and to a lower level to or from an upper level on essentially horizontal, vertically movable carrying platforms, which are located at spaced locations from one another and are flat and resistant to bending in the vertical direction downward and under the load of the products being conveyed and are deflectable in the other direction and are composed of half-hinge cross strips and have a rear, first end strip and a front, second end strip, which is longer than the first end strip, wherein the longitudinal ends of the first and second end strips of all carrying platforms, which said longitudinal ends extend in the transverse direction of the C-shaped fixed tray conveyor, are fastened to lateral, respective first and second circulating drives of equal length, which are guided via deflecting rollers, circulating in an essentially C-shaped pattern in the side view of the C-shaped fixed tray conveyor, and the vertical conveyor has, among other things, for the horizontal arrangement of the carrying platform in the upper level, a first deflecting roller laterally in the rear for the first circulating drive and a second deflecting roller laterally in the front for the second circulating drive at equal height.

BACKGROUND OF THE INVENTION

Vertical conveyors for the vertical conveying of individual products are used to overcome height differences between two levels within a continuous handling system. Distinction is made here between C-shaped fixed tray conveyors and S-shaped fixed tray conveyors. While S-shaped fixed tray conveyors have circulating drives that are guided via deflecting rollers in an S-shaped pattern when viewed in the side view, C-shaped fixed tray conveyors are guided essentially in a C-shaped pattern when viewed in the side view. The products being conveyed are introduced and removed at the top and bottom horizontally on different sides in the case of the S-shaped fixed tray conveyor, and on the same side in the case of the C-shaped fixed tray conveyor. C-shaped fixed tray conveyors are often located at a longitudinal end of two horizontal conveyors, which are arranged one on top of another and between which products are conveyed.

C-shaped fixed tray conveyors have drawbacks compared with S-shaped fixed tray conveyors. Thus, especially the platforms cross the area in which the containers in which the products being conveyed are arranged are removed. As a result, the distance between the carrying platforms and the S-shaped fixed tray conveyor must be increased by the length of one platform compared with the S-shaped fixed tray conveyor. Nevertheless, C-shaped fixed tray conveyors are used for design reasons.

A prior-art C-shaped fixed tray conveyor mentioned in the introduction has the drawback that the broad connections of the carrying platforms collide with the horizontally traveling chains in the head part unless complicated design countermeasures are taken to prevent the collision. Such measures are the use of so-called rubber chains, which are cut out in the area of possible collision. Furthermore, cut-out or arc-shaped chain links are used at the sites of the collision area (so-called dog bone links) in the case of the use of link chains as circulating drives. As a result, prefinishing of the chain is necessary, and the chain can be used in a nonflexible manner. The entire carrying platform moves slightly downward in the head part. This results in a needlessly high head part, which increases the minimum height difference.

SUMMARY OF THE INVENTION

The object of the present invention is to provide a vertical conveyor of the type mentioned in the introduction, in which collision in the head part or in the upper level is prevented from occurring during the vertical conveying with simple measures.

The essence of the present invention is that a third deflecting roller for the first circulating drive, which said third deflecting roller is located higher than the second deflecting roller and permits the contactless guiding of the first circulating drive along with the first end strip of the carrying platform of the second circulating drive along with the second end strip of the carrying platform around the second deflecting roller, is arranged in the front in the upper level of the first deflecting roller. Both circulating drives are thus guided in the area of the second deflecting roller such that the longer second end strip is deflected around the second deflecting roller without touching the first circulating drive, which is preferably located directly above it, in the head part of the C-shaped fixed tray conveyor. The first circulating drive extends in the head part slightly obliquely in relation to the horizontal direction. It was found that the slight obliqueness of the first circulating drive in the head part is harmless during conveying operation with products or containers loading it, which nevertheless do not slip. The second deflecting roller does not need to be arranged exactly at the same height in relation to the first deflecting roller. It is also within the scope of the present invention if the second deflecting roller is located somewhat higher or lower in relation to the first deflecting roller. In any case, a sufficient distance must, however, be maintained from the third deflecting roller located above it. It is advantageous in the present invention that the circulating drives can be designed simply without local cut-outs or special chain links as is necessary according to the state of the art. Prefinishing is thus eliminated. The chain or circulating drive guide according to the present invention offers essentially three advantages: Flexibility, low costs and higher throughput because of the shorter distance between C-shaped fixed tray conveyors, which can now be established compared with the state of the art.

An additional deflecting roller for the second circulating drive, on which said deflecting roller the second circulating drive is deflected by somewhat more than 180°, is arranged upstream of the second deflecting roller on the underside at a spaced location. The space is selected to be such that depending on the arrangement of the third deflecting roller in relation to the second deflecting roller, the two circulating drives always have an equal length. The present invention can be embodied in many different variations. Two embodiment variants are preferred. In the first preferred embodiment variant, the forward strand of the additional deflecting roller extends vertically. In the second preferred embodiment variant, the forward strand of the second deflecting roller extends vertically.

Both circulating drives are preferably driven by bottom-side deflecting rollers, which are arranged on the rear side of the C-shaped fixed tray conveyor where the drive unit is also located. The drive unit is thus removed from the converging area of the lower level.

Front bottom-side deflecting rollers may be designed as tensioning rollers.

The carrying platforms can be guided in the upper level especially close and nevertheless in a contactless manner in relation to the second deflecting roller if the carrying platforms are designed in a special manner such that they are exactly flat and rigid downward in the vertical direction, without sagging. Especially half-joint cross strips, which have two lower hinge points each, are used for this purpose. Each hinge point is connected here to the adjacent hinge point of the adjacent cross strip via a bolt member or the like such that adjacent vertical longitudinal sides of the cross strips act as stop faces in the flat horizontal arrangement of the carrying platforms.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
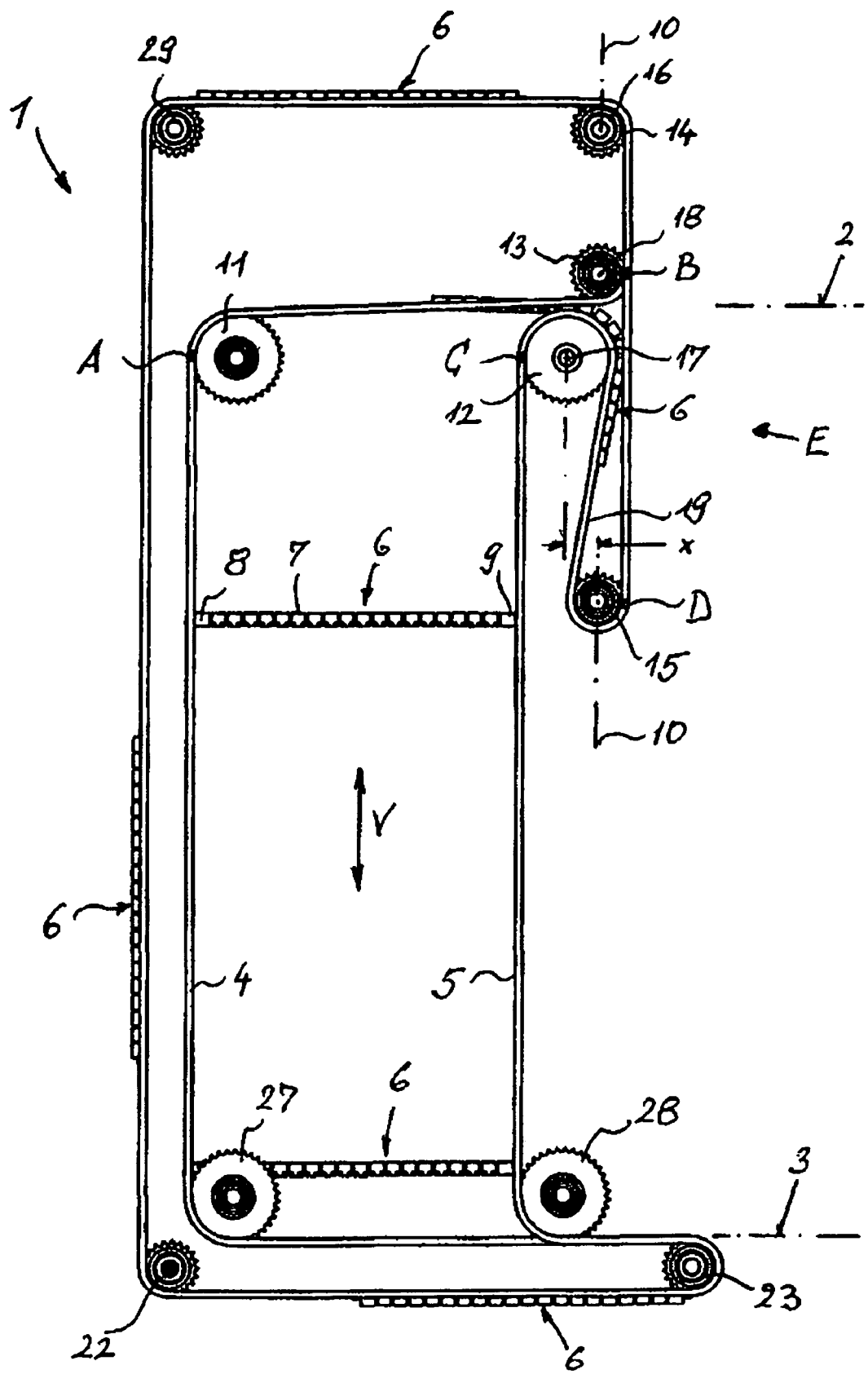
FIG. 1 is a side view of essential parts of a C-shaped fixed tray conveyor according to a first embodiment variant.
Figure 2:
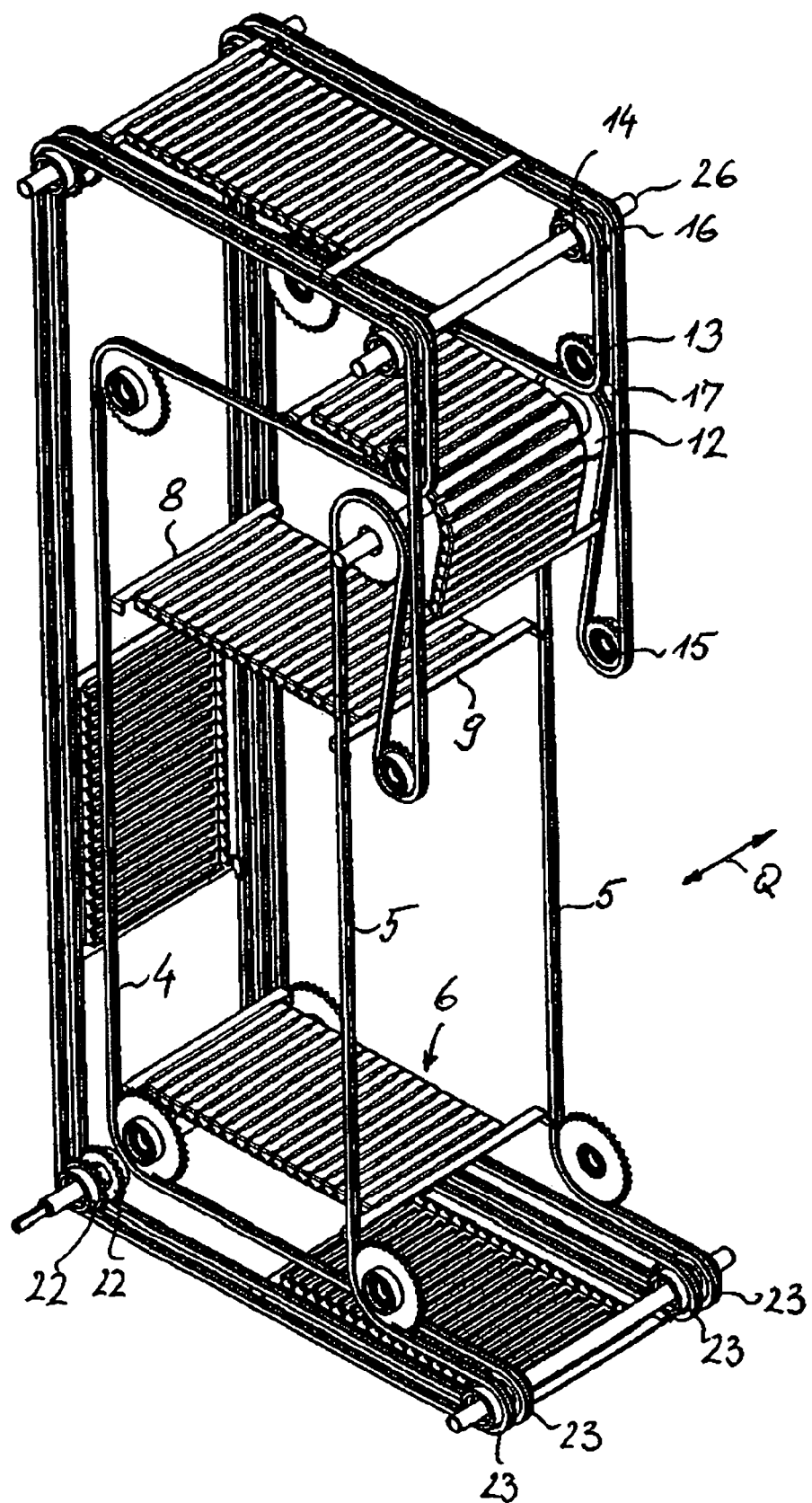
FIG. 2 is a perspective view of the C-shaped fixed tray conveyor according to FIG. 1.
Figure 3:
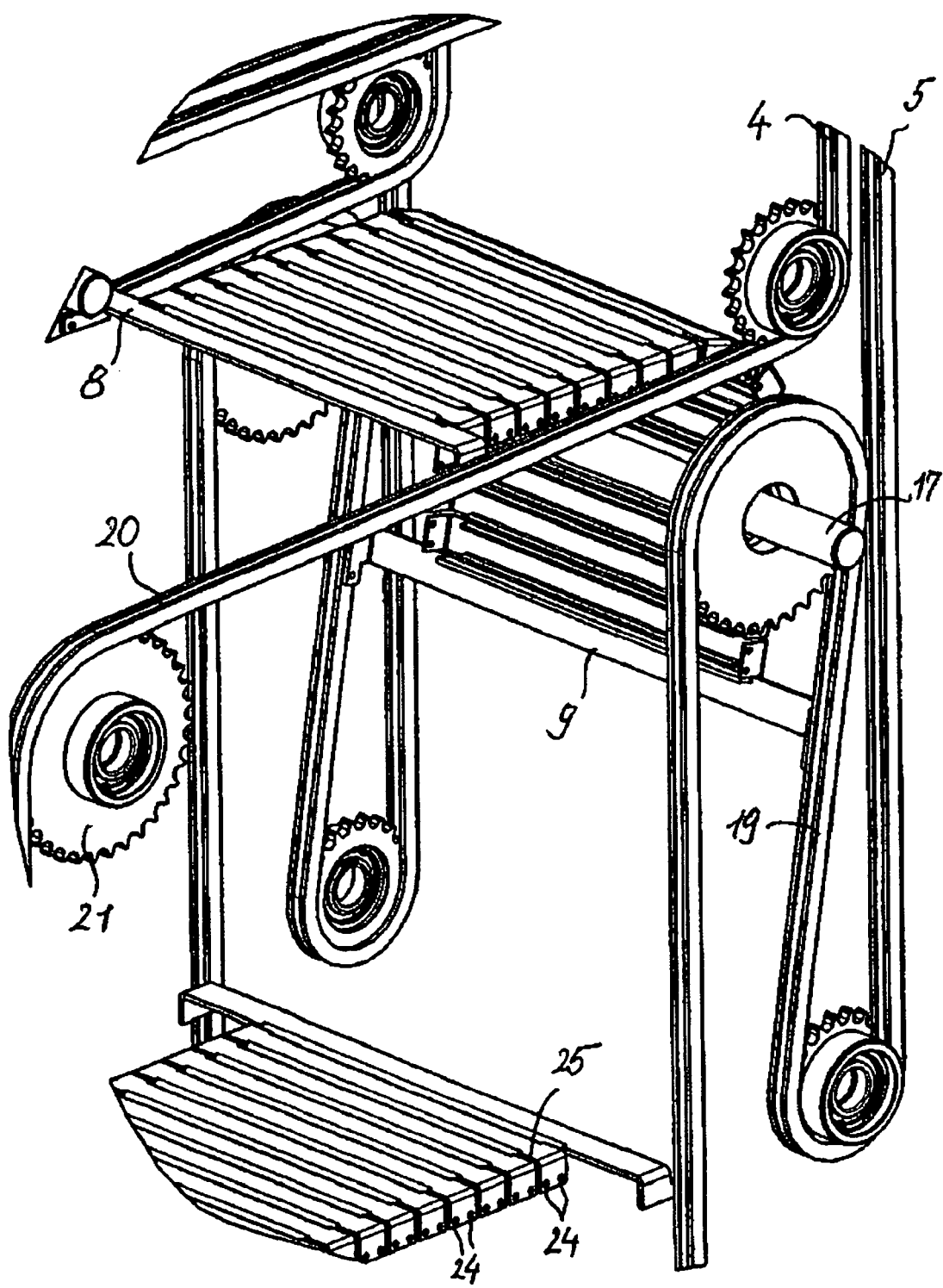
FIG. 3 is a perspective view of detail E according to FIG. 1.

Referring to the drawings in particular, FIGS. 1 through 3 show a vertical conveyor in an embodiment variant according to the present invention. Only essential parts of the vertical conveyor are shown. Frames, drives, containers, products being conveyed, etc., are omitted for reasons of clarity.

The vertical conveyor is a C-shaped fixed tray conveyor 1 for the vertical conveying of individual products from or to a lower level 3 to or from an upper level 2 on essentially horizontal, vertically movable carrying platforms 6 located at spaced locations from one another.

Additional horizontal conveyors, not illustrated, which are arranged one on top of another and are located on the same side of the C-shaped fixed tray conveyor 1, are located at closely spaced locations to the C-shaped fixed tray conveyor 1 in both the upper level 2 and in the lower level 3.

The C-shaped fixed tray conveyor 1 comprises, as can be best determined from FIG. 2, two circulating drives located at closely spaced locations from one another on each side, namely, a first circulating drive 4 and a second circulating drive 5. Each circulating drive is located in a vertical plane. Deflecting rollers are associated with each circulating drive.

The aforementioned carrying platforms 6 are arranged between the first circulating drive 4 and the second circulating drive 5. The carrying platforms 6 have a first end strip 8 each, whose longitudinal ends are connected to the first circulating drive 4 in an articulated manner, as well as a second end strip 9, whose longitudinal ends are connected to the second circulating drive 5 in an articulated manner.

Half-joint cross strips 7 are located between the first end strip 8 and the second end strip 9. The half joint cross strips, which extend in the transverse direction Q of the C-shaped fixed tray conveyor 1, are shorter than the first end strip 8, which is in turn shorter than the second end strip 9.

The half joint cross strips 7 have on the bottom side two hinge points 24 in the transverse direction Q of the C-shaped fixed tray conveyor 1, which are connected to associated hinge points 24 of the adjacent half joint cross strips via bolt members as a half joint, wherein the vertical longitudinal sides 25 in the flat, horizontal arrangement of adjacent half joint cross strips act as stop faces according to FIG. 3.

The carrying platforms 6 are thus flat and resistant to bending under the load of the products being conveyed in the vertical direction V and deflectable around the deflecting rollers in the other direction.

The first circulating drive 4 and the second circulating drive 5 are of equal length.

The first circulating drive 4 is guided in a circulating manner in the head part of the C-shaped fixed tray conveyor, i.e., in the upper level 2, via deflecting rollers 11, 13, 16, 29 and in the lower level 3 via deflecting rollers 22, 23, 27. The circulation assumes an essentially C shape here in a side view of the C-shaped fixed tray conveyor. The path described by the product being conveyed corresponds to the shape of a C. The vertical conveyor is also correspondingly called a C-shaped fixed tray conveyor.

The second circulating drive 5 is guided in a circulating manner in the upper level 2 via deflecting rollers 12, 15, 16, 29 and in the lower level 3 via deflecting rollers 22, 23, 28. This circulation also describes a C shape in the side view.

Like the deflecting rollers 14 and 16, the deflecting rollers 29, 22 and 23 are also double rollers with a coaxial axis, via which the first circulating drive 4 and the second circulating drive 5 are guided.

The deflecting rollers 11, 13, 27 are single rollers of the first circulating drive 4. The deflecting rollers 12, 15, 28 are single rollers of the second circulating drive 5.

The deflecting rollers 11 and the deflecting rollers 12 are located in the upper level 2 at the same height, and the deflecting rollers 27 and 28 in the lower level 3 are likewise arranged at the same height. The deflecting roller 11 is directed vertically in relation to the deflecting roller 27, and the deflecting roller 12 is directed correspondingly vertically in relation to the deflecting roller 28. The deflecting rollers 11, 12, 28 and 27 have equal diameter. The rest of the deflecting rollers have an equal, smaller diameter.

Thus, all carrying platforms 6 are fastened to lateral first and second circulating drives 4, 5 of equal length in an articulated manner and are guided in an essentially C-shaped pattern via the aforementioned deflecting rollers in the side view of the C-shaped fixed tray conveyor 1.

The aforementioned (first) deflecting roller 11 is used laterally in the rear and the aforementioned (second) deflecting roller 12 is used laterally in the front for the horizontal arrangement of the carrying platform 6 in the upper level 2.

The (third) deflecting roller 13 of the first circulating drive 4, which is arranged in the upper level of the first deflecting roller 11, is located higher than the second deflecting roller 12 of the second circulating drive 5 and makes possible the contactless guiding of the first circulating drive 4 along with the first end strip 8 of the carrying platform in relation to the second circulating drive 5 along with the second end strip 9 of the carrying platform 6 around the second deflecting roller 12.

In particular, the third deflecting roller 13 is in the immediate vicinity of and above the second deflecting roller 12, being located in front of the second deflecting roller, which is smaller because of its diameter than the diameter of the second deflecting roller 12, preferably by an amount x. Consequently, the axis of rotation 17 of the second deflecting roller 12 is offset to the rear from the axis of rotation 18 of the third deflecting roller 13 by the horizontal amount x.

Directly vertically, the aforementioned (fourth) deflecting roller 14 of the first circulating drive 4 is arranged upstream of the aforementioned (third) deflecting roller 13 on the top side at a spaced location.

The aforementioned (fifth) deflecting roller 15 of the second circulating drive 5, on which said deflecting roller the second circulating drive 5 is deflected by somewhat more than 180°, is arranged upstream of the second deflecting roller 12 on the underside at a spaced location. The fifth deflecting roller 15 is located vertically in a common plane 10 with the third deflecting roller 13 and with the aforementioned (sixth) deflecting roller 16 of the second circulating drive 5 as well as the fourth deflecting roller 14.

The aforementioned deflecting rollers are arranged in reference to FIG. 1 such that the length AB of the first circulating drive 4 is equal to the length CD of the second circulating drive 5, which is a fundamental condition for the embodiment of the present invention. The points A, B, C, D are located here at the level of the respective deflecting rollers 11, 13, 15 and 12 or their respective axes of rotation.

The aforementioned detail E according to FIG. 1 is shown in a perspective view in a clear form in FIG. 3. It is seen that the second circulating drive 5 or its second end strip 9 cannot collide in the area of the second deflecting roller 12 with the first circulating drive 4 or its first end strip 8 during a conveying operation. The circulating drives 4 and 5 can be designed in a simple manner without special chain links. Prefinishing as is necessary in the state of the art can be eliminated. The circulating drives 4 and 5 may be designed, e.g., in the form of hollow bolt chains 20 and the deflecting rollers correspondingly as chain wheels 21.

Figure 7:
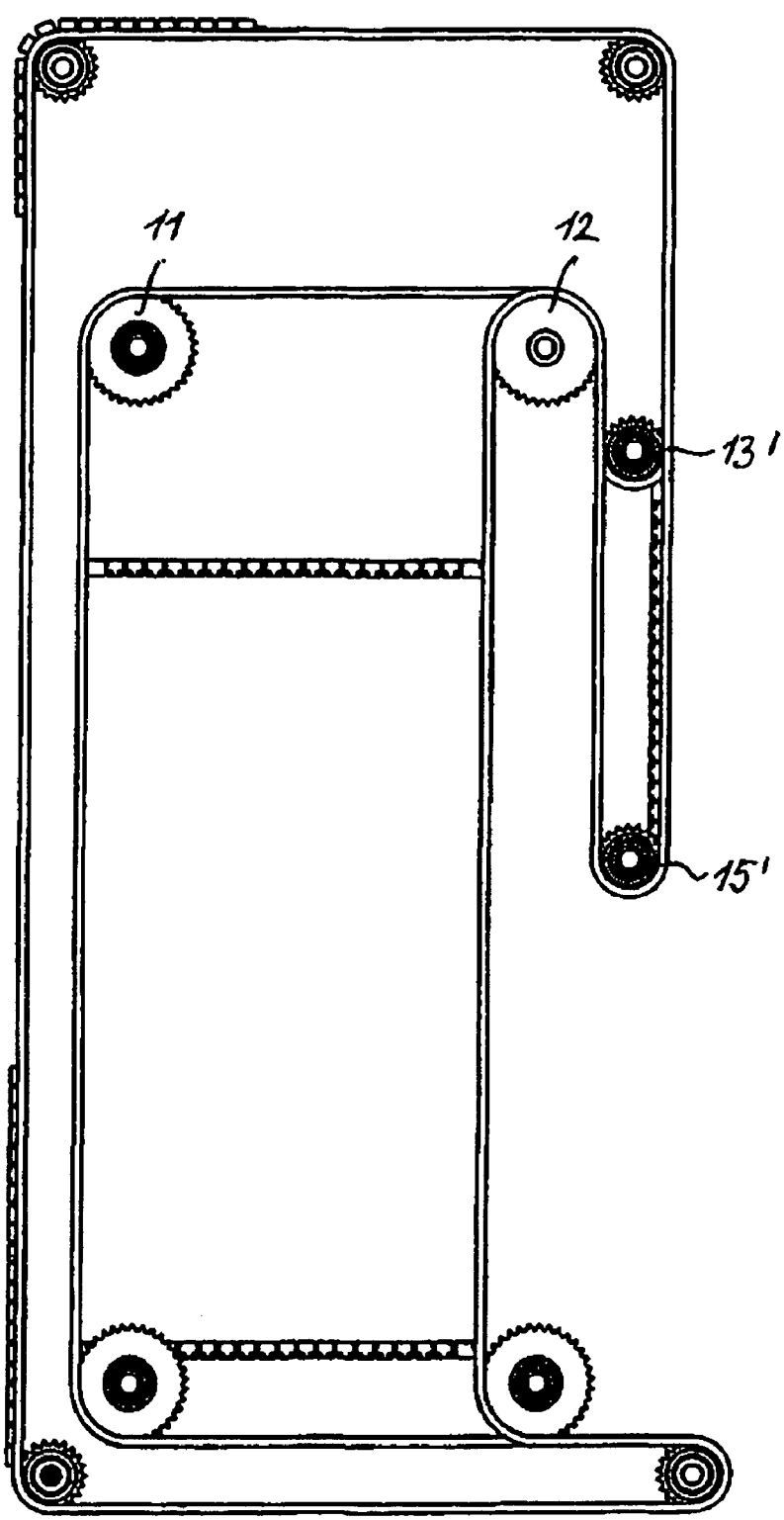
FIG. 7 is a view according to the state of the art.
Figure 8:
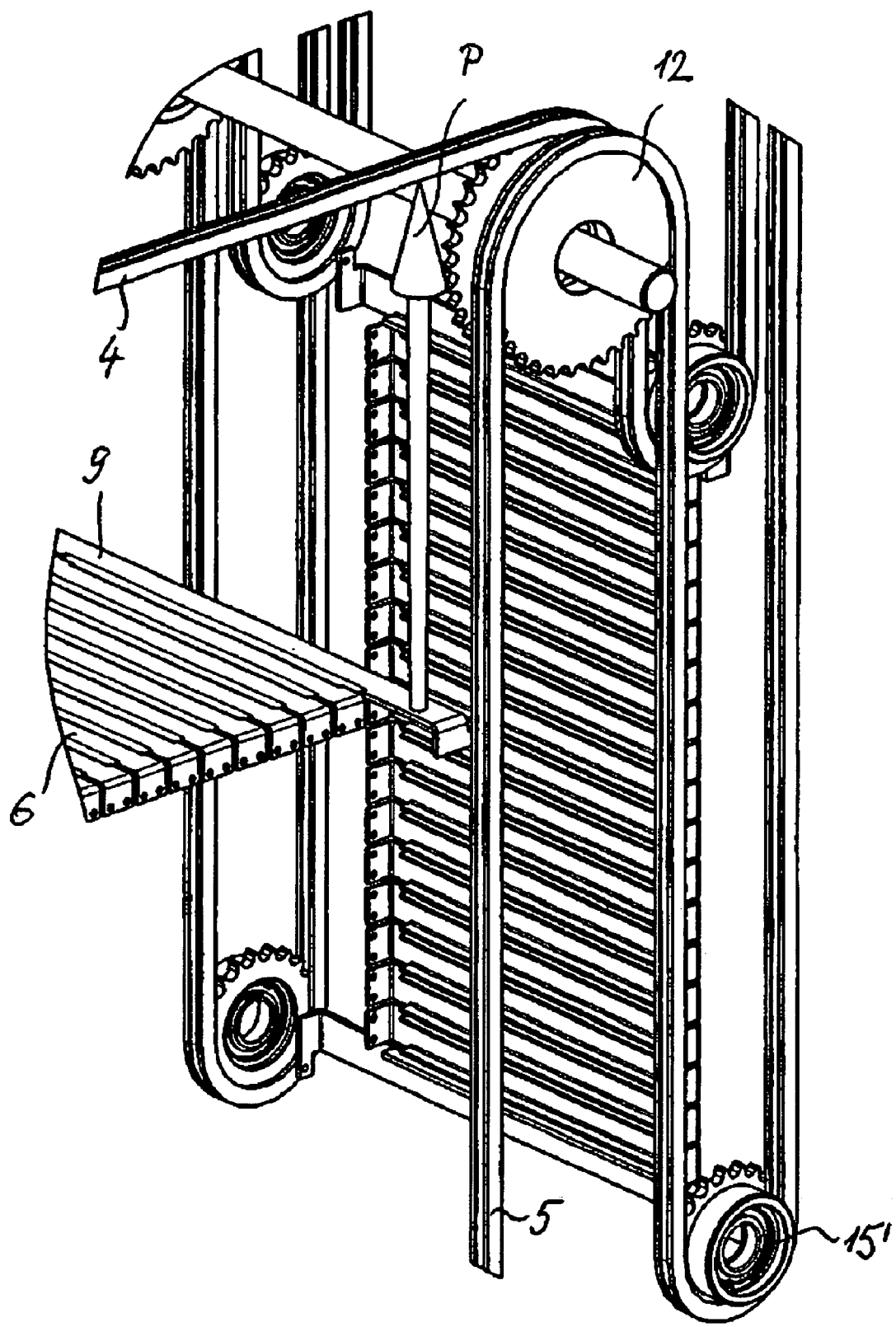
FIG. 8 is a view according to the state of the art.

Compared with this, the third deflecting roller 13' and the fifth deflecting roller 15' are located lower in relation to the second deflecting roller 12 than in the embodiment according to the present invention in the state of the art according to FIGS. 7 and 8. As is indicated by arrow P, the second end strip 9 at the first circulating drive 4 may collide in the area of the second deflecting roller 12 in the state of the art unless special chain links, cut-outs of rubber chains, etc, are used at the first circulating drive 4. The above-mentioned state of the art is shown in FIGS. 7 and 8 only as an example and pertains exclusively to the arrangement of the second deflecting roller 12 in relation to the third deflecting roller 13' and the fifth deflecting roller 15'. All other embodiments, e.g., the design of the carrying platform 6, are retrospective computer graphics in FIGS. 7 and 8 and do not belong to the aforementioned state of the art.

Figure 4:
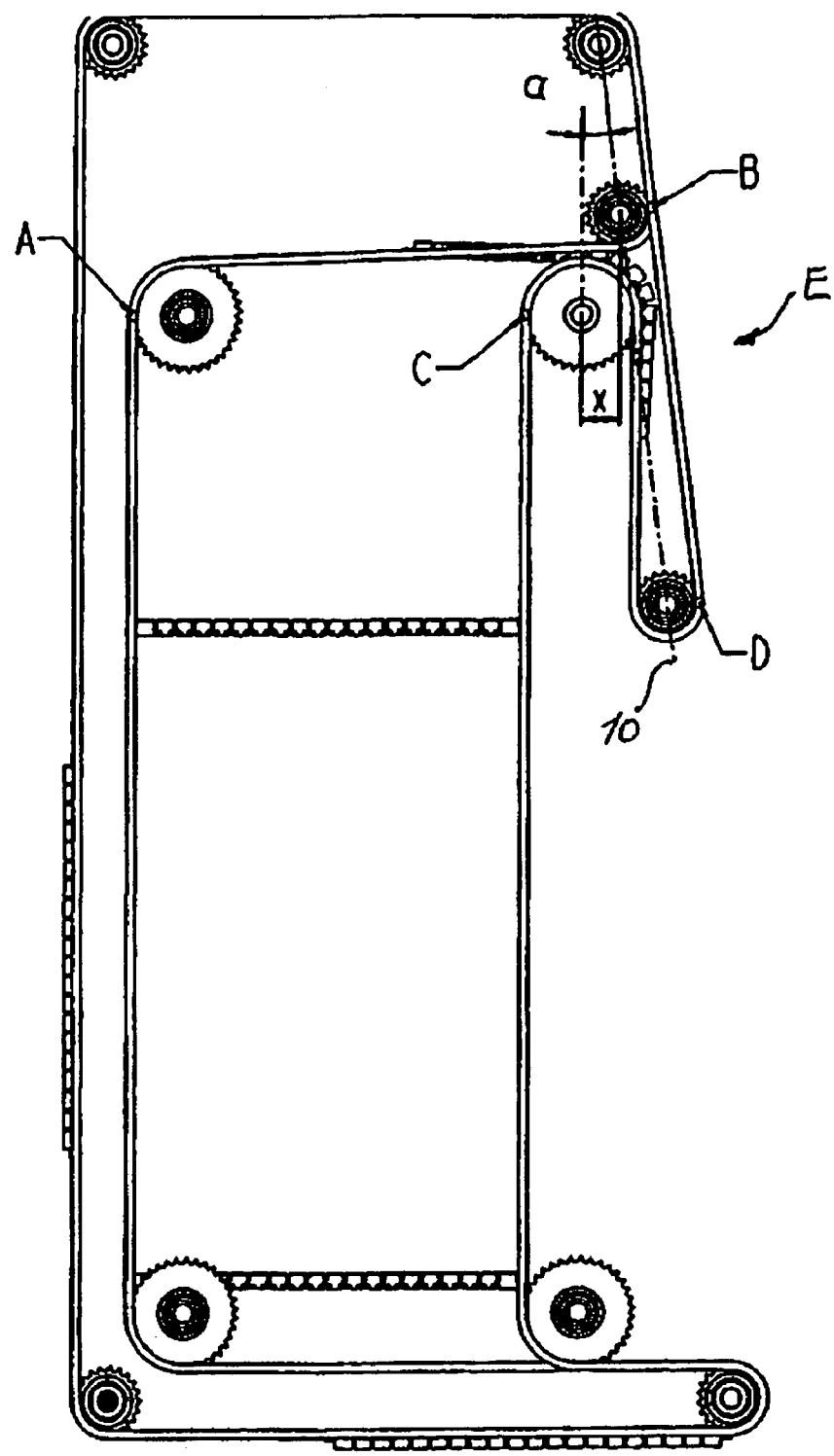
FIG. 4 is a view corresponding to that in FIG. 1 showing another embodiment variant of the C-shaped fixed tray conveyor.
Figure 5:
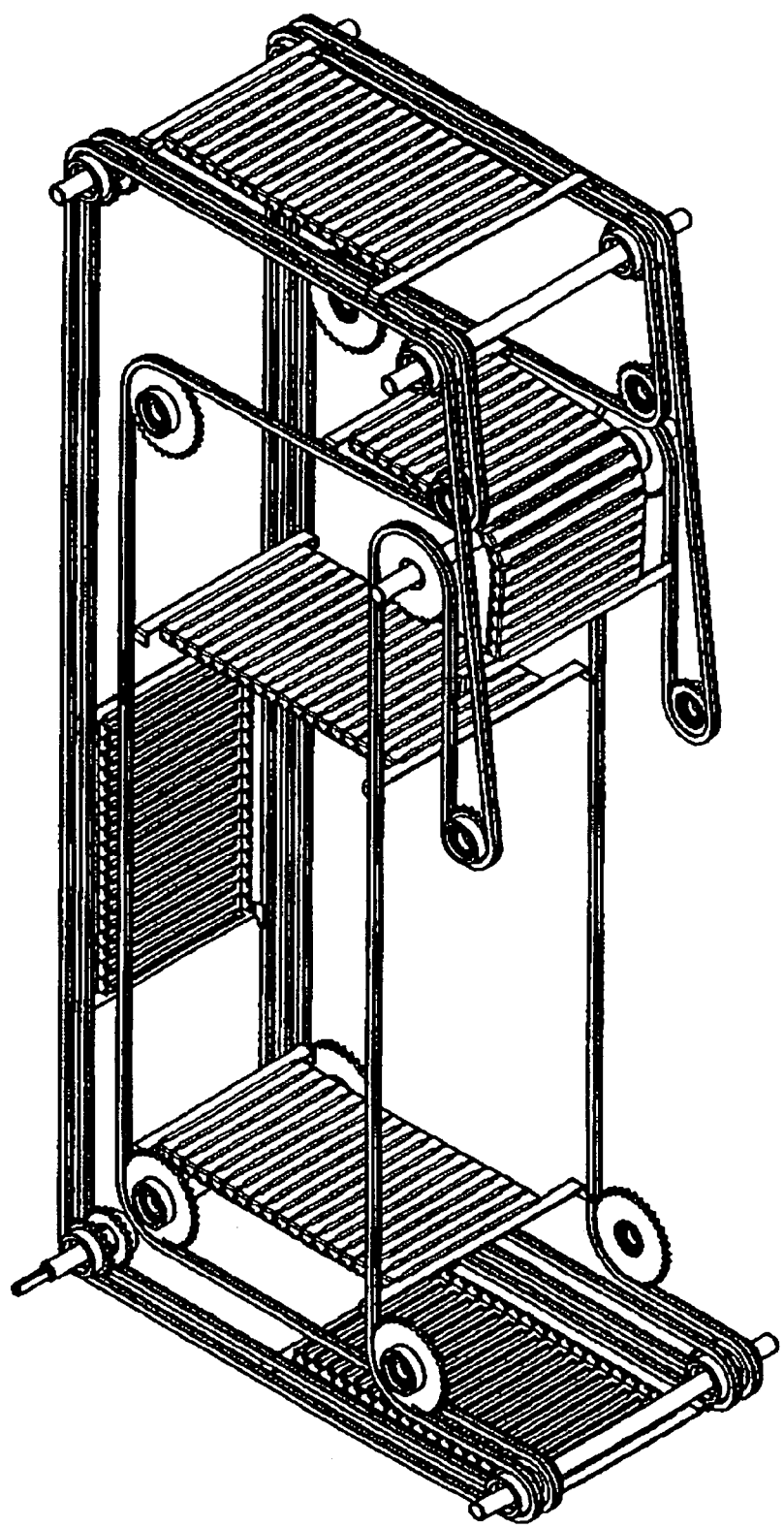
FIG. 5 is a view corresponding to that in FIG. 2 showing the C-shaped fixed tray conveyor according to FIG. 4.
Figure 6:
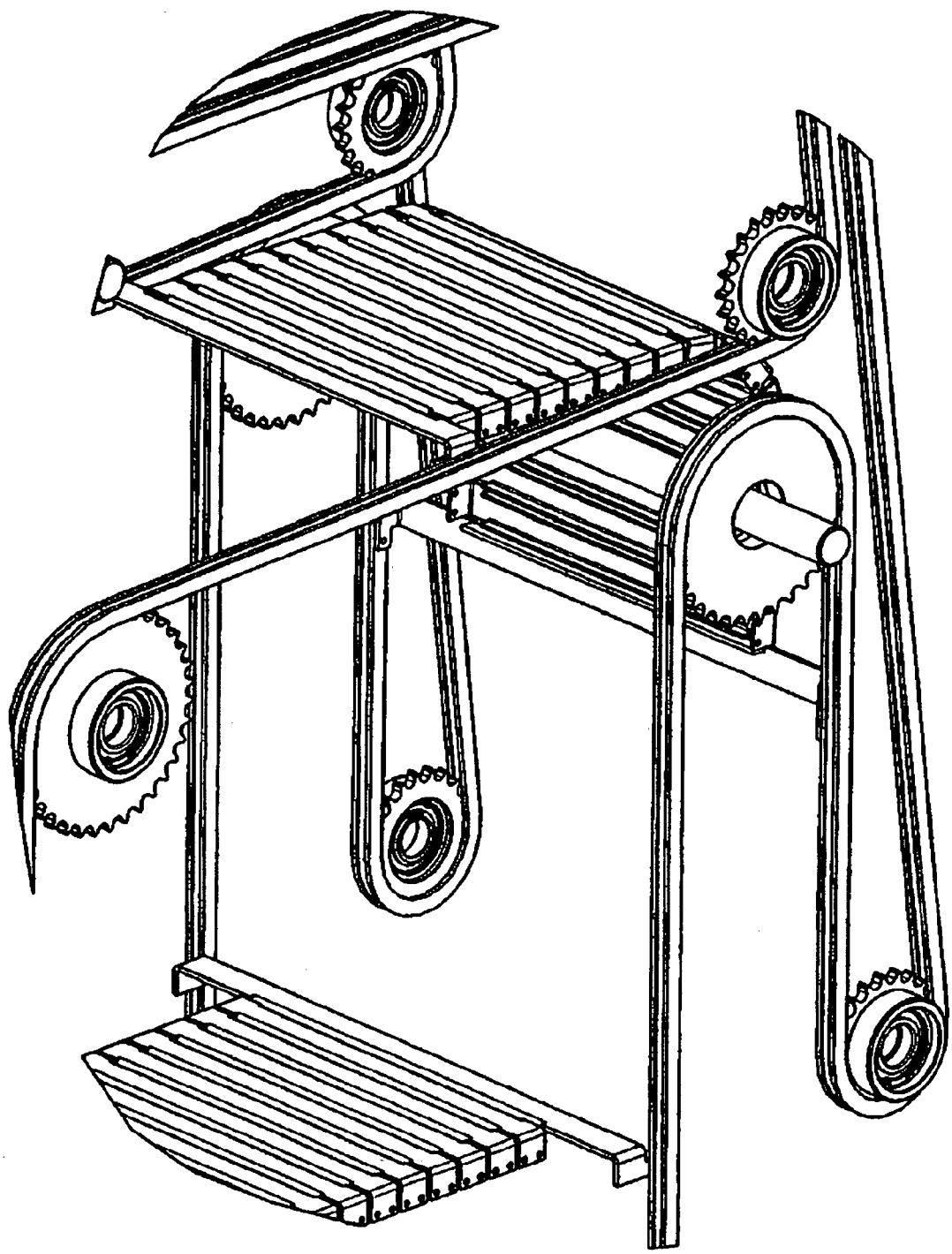
FIG. 6 is a detail E according to FIG. 4 in a view corresponding to that FIG. 3.

FIG. 4 to FIG. 6 show another embodiment variant of the C-shaped fixed tray conveyor 1. According to this embodiment variant, the deflecting rollers 12, 13, 14, 15 and 16 are arranged such that the above-mentioned common plane E of the first embodiment variant extends at a small angle a in relation to the vertical rather than vertically, such that the forward strand 19 of the second circulating drive 4 extends vertically in front of the second deflecting roller 12. The geometric condition of the present invention, according to which the length AB is equal to the length CD, is satisfied in this case as well. The amount x designates the distance between the second deflecting roller 12 and the third deflecting roller 13 in this case as well. Due to collisions of the second circulating drive 0.5, the angle a cannot be selected as desired. If the amount x is considered to be fixed, the angle a may also be considered to be variable.

The angle equals 5° according to the second embodiment variant according to the present invention.

The axes of rotation of the third, fourth, fifth and sixth deflecting rollers 13, 14, 15, 16 may be adjustable in both of the above-mentioned embodiment variants.

The rear bottom-side deflecting rollers 22 of the first and second circulating drives 4, 5 are drive rollers.

The front bottom-side deflecting rollers 23 of the first and second circulating drives 4, 5 are tensioning rollers.

While specific embodiments of the invention have been shown and described in detail to illustrate the application of the principles of the invention, it will be understood that the invention may be embodied otherwise without departing from such principles.

The invention claimed is:

1. A vertical C-shaped fixed tray conveyor for the vertical conveying of individual products from and to a lower level to or from an upper level, the conveyor comprising:

a lateral first circulating drive;

a lateral second circulating drive of equal length with said first circulating drive;

essentially horizontal, vertically movable carrying platforms located at spaced locations from one another, each of said platforms being flat and substantially resistant to bending in a vertical direction downwardly and under the load of the products being conveyed, said platforms being deflectable in another direction and comprising half joint cross strips and a rear first end strip and a front second end strip, said front second end strip being longer than said first end strip, wherein longitudinal ends of said first end strip and said second end strip of each of said platforms extend in a transverse direction of the C-shaped fixed tray conveyor and are fastened to said respective lateral first circulating drive and said lateral second circulating drives;

deflecting rollers guiding said respective lateral first circulating drive and said lateral second circulating drives in a circulating manner essentially in a C-shaped pattern with respect to a side view of the C-shaped fixed tray conveyor, the C-shaped fixed tray conveyor having a front side and a rear side, said deflecting rollers including a first deflecting roller for said first circulating drive laterally adjacent to the rear side and a second deflecting roller for said second circulating drive at equal height to said first deflecting roller and laterally adjacent to the front side for the horizontal arrangement of said carrying platform in said upper level and a third deflecting roller for said first circulating drive, said third deflecting roller being located higher than said second deflecting roller and providing a contactless guiding of said first circulating drive along with said first end strip of each carrying platform of said second circulating drive along with said second end strip of said carrying platform around said second deflecting roller, said third deflecting roller being arranged in the upper level upstream of said first deflecting roller laterally adjacent to the front side.

2. A vertical conveyor in accordance with claim 1, wherein said third deflecting roller is located in the immediate vicinity of and above said second deflecting roller.

3. A vertical conveyor in accordance with claim 1, wherein said third deflecting roller has a smaller diameter than said second deflecting roller.

4. A vertical conveyor in accordance with claim 1, wherein said deflecting rollers include a fourth deflecting roller of equal diameter for said first circulating drive and arranged upstream of said third deflecting roller at the top side at a spaced location.

5. A vertical conveyor in accordance with claim 4, wherein said deflecting rollers include a fifth deflecting roller for said second circulating drive, said second circulating drive being deflected on said fifth deflecting roller by somewhat more than 180° and being aged upstream of said second deflecting roller on the underside at a spaced location.

6. A vertical conveyor in accordance with claim 5, wherein said deflecting rollers include a sixth deflecting roller for said second circulating drive, said sixth deflecting roller being located on said axis of rotation of said fourth deflecting roller and having the same diameter as said fourth deflecting roller and being arranged upstream of said fifth deflecting roller.

7. A vertical conveyor in accordance with claim 6, wherein said third, fourth, fifth and sixth deflecting rollers have equal diameter and parallel axes of rotation, all of which are located in a common plane.

8. A vertical conveyor in accordance with claim 7, wherein said common plane is a vertical plane.

9. A vertical conveyor in accordance with claim 8, wherein an axis of rotation of said second deflecting roller is offset in the rearward direction from an axis of rotation of said third deflecting roller by a horizontal amount smaller than a radius of said second deflecting roller.

10. A vertical conveyor in accordance with claim 7, wherein said common plane has a small angle in the range of about 5° in relation to the vertical direction and a 180° deflected strand of said fifth deflecting roller extends vertically directly in front of said second deflecting roller.

11. A vertical conveyor in accordance with claim 1, wherein said horizontal carrying platforms conveyed in said vertical direction and located at spaced locations from one another are guided via a group of said deflecting rollers of equal diameter.

12. A vertical conveyor in accordance with claim 11, wherein a remainder of said deflecting rollers have a smaller, equal diameter.

13. A vertical conveyor in accordance with claim 1, wherein said circulating drives are hollow bolt chains and said deflecting rollers are chain wheels.

14. A vertical conveyor in accordance with claim 7, wherein at least one of said third, fourth, fifth and sixth deflecting rollers has an adjustable axes of rotation.

15. A vertical conveyor in accordance with claim 1, further comprising bottom rear-side deflecting rollers of said first and second circulating drives, each of said bottom rear-side deflecting rollers comprise a drive roller.

16. A vertical conveyor in accordance with claim 1, further comprising bottom front-side deflecting rollers of said first and second circulating drives, each of said bottom front-side deflecting rollers comprise a tensioning.

17. A vertical conveyor in accordance with claim 1, wherein said half joint cross strips are shorter than said first end strip of said first circulating drive.

18. A vertical conveyor in accordance with claim 1, wherein said half joint cross strips have two hinge points on a bottom side each in said transverse direction of the C-shaped fixed tray conveyor connected to associated hinge points of an adjacent half-joint cross strips via bolt members to form a half joint, wherein said vertical longitudinal sides of said half joint cross strips act as stop faces in a flat, horizontal arrangement of said adjacent half joint cross strips.

* * * * *